United States Patent [19]

Lehnen et al.

[11] 4,246,224

[45] Jan. 20, 1981

[54] PROCESS AND APPARATUS FOR MOLDING ELASTOMERS

[75] Inventors: Josef P. Lehnen; Gerd Zingelmann, both of Leverkusen, Fed. Rep. of Germany

[73] Assignee: Bayer Aktiengesellschaft, Leverkusen, Fed. Rep. of Germany

[21] Appl. No.: 935,478

[22] Filed: Aug. 21, 1978

[30] Foreign Application Priority Data

Aug. 25, 1977 [DE] Fed. Rep. of Germany ....... 2738308

[51] Int. Cl.² .............................................. B29F 1/02
[52] U.S. Cl. ........................... 264/328.14; 264/176 R; 425/207; 264/328.17
[58] Field of Search ................ 264/329, 176; 425/207, 425/543

[56] References Cited

U.S. PATENT DOCUMENTS

| 3,953,006 | 4/1976 | Patarcity | 425/207 X |
| 4,025,274 | 5/1977 | Uemura | 425/207 X |
| 4,117,073 | 9/1978 | Koch | 264/329 X |

FOREIGN PATENT DOCUMENTS 427241 6/1967 Switzerland .............................. 425/207

Primary Examiner—Thomas P. Pavelko
Attorney, Agent, or Firm—Connolly and Hutz

[57] ABSTRACT

A process for the production of compact, shaped articles from vulcanizable rubber mixtures in powder form by means of a screw plasticizing unit, wherein the powder-form rubber mixture is first introduced through a delivery-active feed pocket into the extruder, subsequently plasticized in a mixing zone, compacted by combining the plasticized rubber particles and subsequently shaped in plasticized and homogenized form, and an apparatus for carrying out the above process.

2 Claims, 5 Drawing Figures

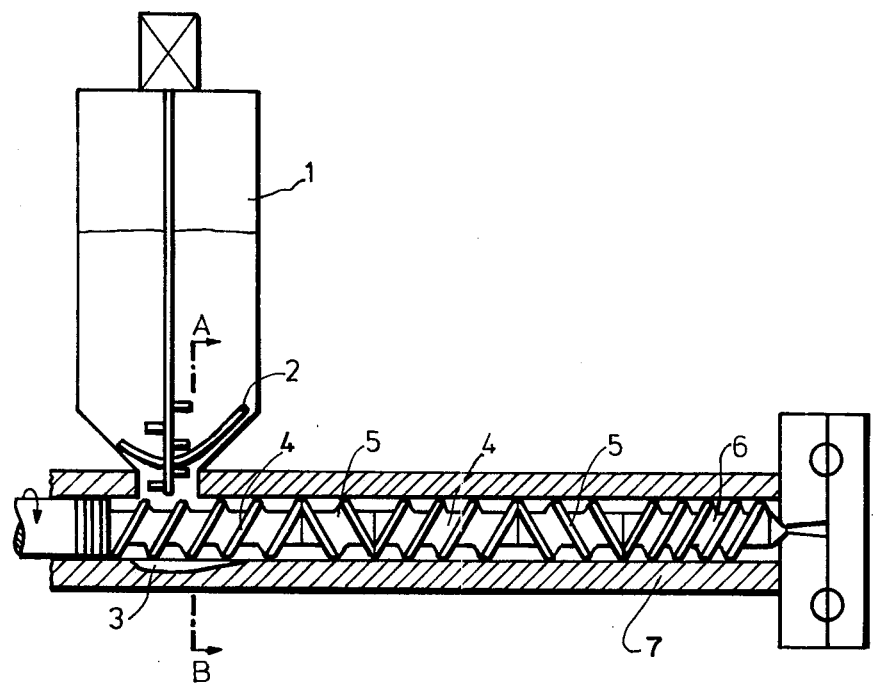
FIG. 1
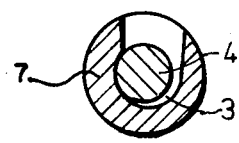
FIG. 2 (A-B)
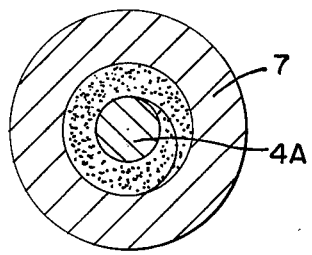
FIG. 3
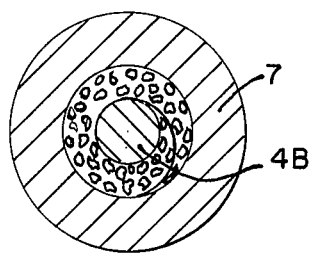
FIG. 4
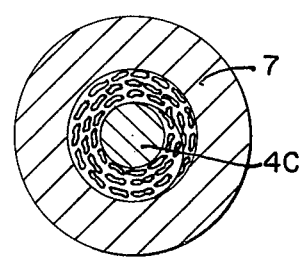
FIG. 5

PROCESS AND APPARATUS FOR MOLDING ELASTOMERS

Vulcanised rubber articles are generally produced by being preformed from plastic compact rubber mixtures and are then subsequently vulcanised by heating. In this context, rubber mixtures are homogeneous mixtures of rubbers and fillers (reinforcing fillers such as carbon black), vulcanisation agents and auxiliaries. Mixtures of this type are processed into mouldings inter alia by the process of injection moulding. This process has been very effectively developed, in particular for processing thermoplastic plastics.

Two fundamental difficulties are involved, however, in processing rubber mixtures by this particular process. Firstly, rubber mixtures (particularly heat-vulcanisable rubber mixtures) are sensitive to intense heating (which causes them to vulcanise prematurely) and secondly, unlike thermoplastic plastics for example, rubber mixtures cannot be melted; instead they are only plasticised for processing. The first difficulty imposes narrow limits upon the thermal and mechanical stability of the mixtures, whilst the second forces processing machines, particularly screw extruders and injection moulding machines, to be filled with rubber mixtures in a homogenously mixed and completely compacted form.

Rubber mixtures have, however, for some time also been available in powder form ("powder-form ready mixes"). As a mixture, this physical form has distinct advantages, particularly from the fabricating point of view. Hitherto, powder-form ready mixes of the type in question have been subjected to a special type of intermediate compacting for further processing.

The object of the present invention is to provide a process and an apparatus by which it is possible to produce vulcanisable mouldings directly from rubber mixtures in powder form ("powder-form ready mixes").

Accordingly, the present invention provides a process for the production of compact, shaped articles from vulcanisable rubber mixtures in powder form by means of a screw plasticising unit, wherein the powder-form rubber mixture is first introduced through a delivery-active feed pocket into the extruder of the screw plasticising unit, subsequently plasticised in a mixing zone, compacted by combining the plasticised powder particles and subsequently shaped in plasticised and homogenised form. Shaping is carried out for example by extrusion or preferably by injection moulding.

The present invention also provides an apparatus for carrying out this process. This apparatus is a screw plasticising unit with a feed attachment and a following injection mould, which is characterised by an undercut in the barrel of the screw machine and by a screw shaft with a delivery section, mixing section and discharge section.

The apparatus of the present invention is capable of receiving the powder-form rubber mixtures, and this would not be possible without the delivery-active undercut in the barrel. In addition, the apparatus enables the mixture, once it has been introduced, to be compacted, plasticised and subsequently homogenised. This requires a zone which has an intense mixing effect and in which the powder particles are plasticised and lose their structure to form a homogeneous mixture.

The delivery-active undercut or feed pocket in the barrel may be constructed for example as follows:

The inner barrel wall in the feed zone can be cut vertically or at an angle of up to 25° to the screw axis. The cut has a depth of 4–6 mm at the bottom of the barrel and dimensions in depth in the direction of throughput. It has the same righthanded pitch as the screw and ends at about 270° towards the middle of the barrel.

A preferred shaft for the screw extruder may be designed as follows:

It comprises a single-flight or multiflight delivery zone, one or more adjoining shearing and/or mixing zones of known type which rapidly place the material being processed (powder-form rubber mixture) under pressure and enable it to be worked with gradual expansion, a mixing zone in which helical lands, optionally with a variable pitch, are superimposed upon helical grooves with a steeper pitch, one or more flights being present, optionally another shearing zone and a delivering discharge zone.

The shaft preferably has a length to diameter ratio (l/d) of from about 12 to 20 and the individual zones have substantially the following lengths (expressed as multiples of the diameter):

delivery zone: 6 to 10
shearing zone: 1 to 3
mixing zone: 2 to 5
[shearing zone]: 1 to 3
discharge zone: 2.

In one particularly preferred embodiment of the apparatus of the present invention, the screw shaft has a special surface configuration: the lands which are in contact with the housing are completely smooth, whilst the sides and the screw base are roughened. This effect may be obtained by sand blasting the screw shaft, although it is more favourable and more permanent to etch the surface, followed by hardening. In this way, it is possible to form irregular depressions, for example from 0.01 to 1 mm both in depth and diameter. The depressions may also be elongate and may have a preferential direction (for example the direction of material flow through the screw).

BRIEF DESCRIPTION OF THE DRAWINGS

Novel features and advantages of the present invention will become spparent to one skilled in the art from a reading of the following description in conjunction with the accompanying drawings wherein similar reference characters refer to similar parts and in which:

FIG. 1 is a longitudinal cross-sectional view in elevation of an apparatus for performing the method, which is illustrative of one embodiment of this invention:

FIG. 2 is a cross sectional-view taken through FIG. 1 along the line A-B;

FIG. 3 is a cross-sectional view taken through the root of the shaft of the apparatus shown in FIG. 1, showing one form of structured surface utilized in this invention;

FIG. 4 is another cross-sectional view similar to FIG. 3; and

FIG. 5 is a further cross sectional view similar to FIG. 3.

DESCRIPTION OF THE PREFERRED EMBODIMENTS

FIG. 3 shows roughened sides and base of screw 4A obtained by sand blasting. FIG. 4 shows roughened sides and base of screw 4B obtained by etching, followed by hardening to form irregular depressions. FIG.

5 shows roughened sides and base of screw 4C having elongaten depressions having a preferential direction in the direction of material flow through screw 4C.

FIG. 1 is a longitudinal section illustrating the principle of the apparatus as a whole. The reference numerals in FIG. 1 have the following meanings: 1 Feed unit with 2 stirrer, feed pocket 3, screw 4, mixing zones 5, discharge zone 6, and barrel 7.

FIG. 2 is a cross-sectional view on the line A-B of FIG. 1. The feed pocket (3) is clearly visible.

Pocket 3 provides a short shallow concave space disposed peripherally and longitudinally between screw 4 and barrel 7 in the vicinity of feed unit 1 about the inlet portion of screw 4 disposed opposite feed unit 1.

The process of the present invention may be applied to any rubber mixtures in powder form. However, it is preferably applied to mixtures of: polychloroprene, butadiene-acrylonitrile copolymers, styrene-butadiene copolymers, polybutadiene, natural rubber, ethylene-propylene terpolymers and rubber which already contain fillers such as carbon black, vulcanisation aids, stabilisers, antiagers and antiozonants, and optionally plasticiser oils and factice.

The process of the present invention not only eliminates the need for the hitherto necessary intermediate plasticisation, but it also imposes less strain on the rubber material used so that satisfactory mouldings and better vulcanisates are obtained.

The process according to the invention is further illustrated by the following Examples:

| (1) Rubber mixture: | Parts by weight |
|---|---|
| nitrile rubber (butadiene-acrylonitrile copolymer) | 100 |
| fillers | 105 |
| vulcanisation aids | 8 |
| plasticiser | 25 |
| antiager | 3 |

The mixture is in the form of a free flowing powder having grain sizes in the range from 0.1 to 2 mm.

The mixture is compacted and homogenised in an apparatus of the type shown in FIG. 1, moulded in the adjoining 10-cell injection mould 12 into shoulder protectors for photographers' shoulder bags and vulcanised in the mould for 90 seconds at 160° to 200° C.

We claim:

1. A process for the production of compact, shaped articles from vulcanisable rubber mixtures in powder form by means of a screw plasticising unit, having a screw and a barrel, whereby the powder-form rubber mixture is first introduced by a feed unit through a delivery-active feed pocket into an inlet portion of the screw, the delivery-active feed pocket providing a short shallow concave space disposed peripherally and longitudinally between the screw and the barrel in the vicinity of the feed unit about the inlet portion of the screw disposed opposite the feed unit, the powder mixture being subsequently plasticised in a mixing zone, compacted by combining the plasticised rubber particles and subsequently shaped in plasticised and homogenised form.

2. A process as claimed in claim 1, wherein the shaping is carried out by injection moulding.

* * * * *